US008327784B2

(12) United States Patent
Costas

(10) Patent No.: US 8,327,784 B2
(45) Date of Patent: Dec. 11, 2012

(54) APPARATUS FOR GENERATING AND DISTRIBUTING COMPRESSED AIR FOR REDUCING DRAG

(76) Inventor: Dan Nicolaus Costas, Apollo Beach, FL (US)

( * ) Notice: Subject to any disclaimer, the term of this patent is extended or adjusted under 35 U.S.C. 154(b) by 0 days.

(21) Appl. No.: 13/179,446

(22) Filed: Jul. 8, 2011

(65) Prior Publication Data

US 2011/0259257 A1    Oct. 27, 2011

Related U.S. Application Data

(63) Continuation-in-part of application No. 12/728,661, filed on Mar. 22, 2010, now Pat. No. 7,997,221.

(60) Provisional application No. 61/210,685, filed on Mar. 23, 2009.

(51) Int. Cl.
*B63B 1/34* (2006.01)
*B63B 1/38* (2006.01)

(52) U.S. Cl. .................................................. 114/67 A
(58) Field of Classification Search ................ 114/67 R, 114/67 A, 288–290
See application file for complete search history.

(56) References Cited

U.S. PATENT DOCUMENTS

| 661,303 | A | 11/1900 | Briggs |
| 907,086 | A | 12/1908 | Naselius |
| 1,621,625 | A | * | 3/1927 | Casey | ......................... 114/67 A |
| 1,697,257 | A | 1/1929 | Anissimoff |
| 1,822,223 | A | 8/1931 | Klinger |
| 1,894,256 | A | 1/1933 | de Ganahl et al. |
| 2,145,463 | A | 1/1939 | Spinanger |
| 2,378,822 | A | 6/1945 | Barry |
| 2,954,750 | A | 11/1954 | Crump et al. |
| 2,764,954 | A | * | 10/1956 | Oeltgen | ......................... 440/40 |
| 3,342,032 | A | 9/1967 | Cox et al. |
| 3,534,699 | A | 10/1970 | Ruona |
| 4,393,802 | A | 7/1983 | Rizzo |
| 4,513,679 | A | 4/1985 | Allen |
| 5,031,559 | A | 7/1991 | Bartholomew |
| 5,054,412 | A | 10/1991 | Reed et al. |
| 5,090,352 | A | 2/1992 | Stanford |
| 5,117,882 | A | 6/1992 | Stanford |
| 5,456,201 | A | 10/1995 | Bobst |
| 5,476,056 | A | 12/1995 | Tokunaga et al. |

(Continued)

FOREIGN PATENT DOCUMENTS

EP    645302    3/1995

(Continued)

OTHER PUBLICATIONS

Nouri, N. M. et al., "Improvement of a Microbubble Generator's Performance Via Reliance on Fluid Dynamics Characteristics", Journal, Jun. 2009, pp. 189-194, vol. 25-2, Journal of Mechanics, Tehran, Iran. Seminar Topics, "Drag Reduction in Ships using Microbubbles Technology", Report, Feb. 2010, Published online at www.seminarprojects.com.

*Primary Examiner* — Ajay Vasudeva
(74) *Attorney, Agent, or Firm* — Marc E. Hankin; Kevin Schraven; Hankin Patent Law, APC

(57) ABSTRACT

The invention is an apparatus and method for reducing the drag that a vessel hull experiences when moving through the water by interposing air bubbles between the hull and the stream of water that the vessel is moving through. The invention delivers compressed air to the bottom of the vessel without the need for a high energy air compressor.

12 Claims, 10 Drawing Sheets

U.S. PATENT DOCUMENTS

| | | |
|---|---|---|
| 5,524,568 A | 6/1996 | Bobst |
| 5,575,232 A | 11/1996 | Kato et al. |
| 5,613,456 A | 3/1997 | Kuklinski |
| 5,967,071 A | 10/1999 | Wipper |
| 6,092,480 A | 7/2000 | Takahashi et al. |
| 6,145,459 A | 11/2000 | Takahashi et al. |
| 6,186,085 B1 | 2/2001 | Kato et al. |
| 6,324,480 B1 | 11/2001 | Takahashi et al. |
| 6,356,816 B1 | 3/2002 | Katz |
| 6,748,891 B2 | 6/2004 | Takahashi |
| 6,789,491 B2 * | 9/2004 | Takahashi et al. .......... 114/67 A |
| 7,004,094 B2 | 2/2006 | Carson |
| 7,017,505 B2 | 3/2006 | Burg |
| 7,267,067 B2 | 9/2007 | Stubblefield et al. |
| 7,997,221 B2 * | 8/2011 | Costas ....................... 114/67 A |

FOREIGN PATENT DOCUMENTS

| | | |
|---|---|---|
| JP | 61220997 | 10/1986 |
| JP | 03243489 | 10/1991 |
| JP | 2001239995 | 9/2001 |
| JP | 2002274478 | 9/2002 |

\* cited by examiner

APPARATUS FOR GENERATING AND DISTRIBUTING COMPRESSED AIR FOR REDUCING DRAG

CROSS-REFERENCE TO RELATED APPLICATIONS

This application is a Continuation in Part of U.S. Non-Provisional patent application Ser. No. 12/728,661, filed on Mar. 22, 2010, now U.S. Pat. No. 7,997,221, titled "Apparatus for Reducing Drag on a Nautical Vessel, by inventor Dan Nicolaus Costas, the contents of which are expressly incorporated herein by this reference. Priority is also claimed to U.S. Provisional Patent Application No. 61/210,685, filed on Mar. 23, 2009, titled "Method and Systems for Naval Drag Reduction (Modular)," by inventor Dan Nicolaus Costas, the contents of which are expressly incorporated herein by this reference.

FIELD OF INVENTION

This invention relates to a method and apparatus for drag reduction by interposing air bubbles between the skin of the hull of a nautical vessel and the stream of water that the vessel is moving through. More particularly, the invention relates to a method and apparatus of interposing air bubbles without the need of an air compressor or other external high energy source. Specifically, the invention relates to an apparatus and method for generating compressed air from the movement of the vessel through the water and releasing the compressed air, where needed, in order to reduce drag on the vessel.

BACKGROUND

For years, nautical vessel makers have been aware that placing air bubbles on the bottom of a vessel hull will reduce the drag of the vessel as it passes through water. The challenge has been how to efficiently place the air bubbles on the bottom of the hull. The primary solution to the challenge is to use high energy air compressors to place air on the bottom of a hull for drag reduction. The air placement is typically accomplished by screens or ejector slits mounted in the hull surface of a ship, mostly on the bottom side. Due to the large hull surfaces that need to be covered, large amounts of air need to be provided to the bottom of the ship. Additionally, cleaning means for the screens or ejector slits need to be provided to prevent the clogging generated by marine algae barnacles and other marine organisms. Bottoms with air cavities expose just a fraction of the bottom of the hull to direct contact with the water, thus reducing the drag accordingly.

The concept of using air coated hulls to reduce drag in water has previously been suggested in the maritime literature. Indeed, reducing the hull skin friction component of drag by injecting bubbles or micro-bubbles was first reported in 1973 by the United States Naval Academy using a cylinder coated with small bubbles of hydrogen generated by electrolysis to study reduction in friction. More recently, the United States Defense Advanced Research Projects Agency (DARPA) funded a program to research reduction in friction drag focusing on developing numerical models, scale model experiments, and computer simulations for air/bubble injection. In Japan, the National Maritime Research Institute (NMRI) and the Shipbuilding Research Association has carried out bubble experiments using ships and scale models of ships in addition to plate experiments in test tanks. It has been reported that effects occur, including: (1) the reduced viscosity of air; and (2) the shearing of bubbles in the boundary layer. Hull skin friction reductions of up to 5% were reported for ships and up to 80% drag reduction for flat plates. In these experiments, the bubbles were active injections and had a power penalty. Moreover, they were only effective near the point of injection because they did not remain within the boundary layer close to the hull. In the NMRI full-scale tests they also degraded the efficiency of propellers. Another approach pioneered in Russia has been to pump air behind wedge and stepped shaped features to create an air-film along the body of the object, for example a torpedo, or via super-cavitation to create the same effect.

It is clear that air films retained at a submerged solid surface should be able to reduce drag, but current approaches require an active input of energy to do so. For example, U.S. Pat. No. 5,524,568, issued to Bobst, discloses a boat hull that "creates a layer or film of bubbles adjacent to the submerged region of a boat hull by releasing a flow of air at numerous spaced apart locations on that region of the hull." However, the Bobst invention requires the use of an air compressor pump, which takes energy and greatly reduces or even completely offsets the energy savings achieved by the effect of the bubbles.

There are numerous patents issued in this field using air bubbles which have been proved in lab tests to lower up to 80% the frictional component of the drag generated by a vessel's motion through water. Due to the fact that the air bubbles are most effective if they are released in a manner such that they will wash (or lubricate) the flat hull's bottom, and not released in a manner such that the air bubbles go out and up the side of the hull, the vast majority of these patents explicitly teach or suggest the use of an air compressor. An air compressor is the obvious way to overcome the high static water pressures present at the bottom of the submerged vessel hull. Unfortunately, standard air compressors, while able to deliver air at high pressure, are very, very inefficient at delivering the high volumes of air needed for covering the large bottom surfaces of a flat bottomed vessel. Moreover, the energy economy obtained by the lubrication is largely offset by the air compressor's fuel consumption, rendering this solution essentially useless.

Other references, such as U.S. Pat. No. 6,748,891, try to replace the compressor using the various methods to create depression where air is drawn, and combine these methods with a standard air fan. The problem with U.S. Pat. No. 6,748,891 and other similar references, is that the small pressure differentials created work only for relatively small drafts. Additionally, regarding the combination with an air fan, there is a tradeoff between the volume and the pressure of the air delivered, making them undesirable in applications where both high volume and high pressure are needed. Simply put, the solutions offered by these references do not work beyond a certain draft, and are essentially worthless. Finally, the above suggested solutions are invasive to the hull and expensive to implement on either an existing hull or a newly built hull. The solutions also create additional drag by adding wings outside the originally designed frame of the boat.

Furthermore, there are prior references which disclose an air injector, which is disposed in the stream of water going downwards and under the hull. Full scale experiments with a Japanese cement carrier vessel used precisely these prior art techniques and obtained only a 2-3% drag reduction.

Historically, it has been difficult to convince boat owners to allow their boats to undergo invasive modifications with no guarantee of any gain in efficiency. The bows of the larger carriers, as well as the majority of other types of boats, have V-shaped bows that split the stream of incoming water sideways and away from the hull. In this design, the bubbles released in such streams end up mostly on the side of the vessel, with only a small amount washing underneath the hull. This small amount is typically insufficient to make a difference to the efficiency of the vessel. Even if a large volume of bubbles is released at the bottom of one of these ships in the bow region, these bubbles will quickly wash away and, if not replenished, these bubbles will only lubricate a fraction of the large and typically long hull. As such, the bubbles only lower the drag a small amount.

For smaller crafts, with shallower drafts and relatively short bodies, obtaining sufficient lubrication should be easier to obtain. However, such sufficient lubrication has not yet been achieved in the Prior Art. For example, U.S. Pat. No. 7,004,094 offers a lubrication solution that, when put into practice, is very cumbersome to implement, difficult to maintain, and inoperable. In short, in practice, U.S. Pat. No. 7,004,094 either does not work or does not accomplish a sufficient lubrication for a small vessel.

Thus, what is needed is to provide the equivalent of a bubble layer or an air film in a manner that does not require active power input, or at least, very low power, and which has a strong chance of being retained at the surface of the submerged hull where it is needed to effectively reduce the drag of the vessel as it moves through the water.

Furthermore, because air bubbles have a tendency to migrate and dissipate as they lubricate the bottom of the vessel, the air bubbles need to be constantly replenished in order to maintain optimal drag reduction. The migration and dissipation of the air bubbles is especially quick at the deeper submerged parts of the vessel. In order to accomplish this constant replacement of air bubbles, vast amounts of compressed air are needed to overcome the static water pressure at these depths. Unfortunately, rather than becoming more efficient when higher volumes of air are needed, the standard air compressors generally become less efficient when higher volumes of air are needed. At best, the fuel used by a standard air compressor would be equal to the amount of fuel saved by the drag reduction. As such, standard powered air compressors are not an efficient enough solution to constantly replenish the air bubbles deep at the bottom of a vessel.

As discussed above, there are many references teaching how bubbles released once at the bow of a vessel with lubricate the hull of the vessel and reduce drag. Unfortunately, these references: (1) do not take into consideration the migration and dissipation of the bubbles that are merely released at the bow of the vessel; (2) make incorrect assumptions; and/or (3) simply would not work.

Further, when a vessel is sailing, it may frequently drift sideways due to winds or currents. Therefore, it is important to have a way to replenish the air bubbles directly to the sides of the vessel hull, where they are quickly washed away. Before the present invention no apparatus or method that provided a network of removable pipes to distribute air bubbles to any given location on the bottom of a hull.

Thus, there is a need in the art for an apparatus and method to generate large amounts of compressed air as air bubbles in a consistent manner to the bottom and sides of a vessel hull.

The present invention offers solutions to these problems adapted to be used for either small vessels with a predictable shallow draft and relatively short hulls or large displacement vessels, with variable drafts and long hulls.

SUMMARY OF THE INVENTION

To minimize the limitations in the prior art, and to minimize other limitations that will become apparent upon reading and understanding the present specification, the present invention is a method and apparatus for providing air bubbles along the submerged hull of a nautical vessel such that drag is reduced as the vessel moves through the water.

One embodiment of the invention is an apparatus for generating compressed air on a nautical vessel, comprising: one or more water intake openings; one or more water pistons; and one or more compressed air storage tanks. The water pistons are comprised of one or more water inlet valves, one or more water outlet valves, one or more air inlet valves, and one or more air outlet valves. The water intake openings are connected to the water pistons at the water inlet valves. The water pistons and the compressed air storage tanks are connected and the air outlet valves are between the one or more water pistons and the one or more compressed air storage tanks. A forward movement of a nautical vessel forces a water into the water intake openings, through the water inlet valves, and into the water pistons. The water forced into the water pistons compresses an air within the water pistons creating a compressed air within the one or more water pistons. The compressed air within the one or more water pistons is compressed through the one or more air outlet valves and into the one or more compressed air storage tanks. Preferably, the compressed air forced into the one or more compressed air storage tanks is released as a plurality of air bubbles at one or more locations along the hull of the vessel; and the plurality of air bubbles reduce a friction between the vessel and the water. After the water in the one or more water pistons rises to a maximum level, the one or more air outlet valves preferably close, the one or more water outlet valves open, and the one or more air inlet valves open, such that the water exits the one or more water pistons through the one or more water outlet valves and a new ambient air enters the one or more water pistons through the one or more air inlet valves. Preferably, the apparatus for generating compressed air on a nautical vessel is further comprised of a plurality of pipes. The plurality of pipes are preferably connected to the one or more compressed air storage tanks. The plurality of pipes preferably have a plurality of valves, such that the plurality of valves are between the one or more compressed air storage tanks and a plurality of openings of the plurality of pipes. Preferably, the one or more of the plurality of valves are opened the compressed air passes through the one or more open valves and exits the plurality of pipes through the plurality of openings. The compressed air exits as the plurality of bubbles. The apparatus for generating compressed air may be mounted within an interior of a hull of the nautical vessel or it may be mounted on an exterior of a hull of the nautical vessel.

Another embodiment of the invention is an apparatus for generating compressed air on a nautical vessel, comprising: at least one water intake opening; at least one air injector; at least one descending pipe; at least one chamber; at least one pressure device (the pressure device may be an adjustable pressure valve or a looping pipe); and at least one compressed air storage tank. The at least one compressed air storage tank has at least one air inlet valve and the at least one air injector is comprised of at least one air intake. At least one stream of water, generated by a motion of a nautical vessel, enters the at least one air injector and creates a depression that pulls an air into the at least one stream of water. A plurality of air bubbles are formed in the at least one stream of water. The plurality of air bubbles are carried in the stream of water down the at least one descending pipe to the at least one chamber. The stream of water and the plurality of air bubbles separate in the at least one chamber forming at least one separated air portion and at least one water portion. The at least one separated air portion is compressed by a pressure of the at least one water portion; and the at least one compressed separated air portion passes through the at least one air inlet valve and into the at least one compressed air storage tank to form the at least one compressed air. Preferably, the at least one water portion exits the at least one chamber through the at least one looping pipe. The pressure is preferably determined by a height of the at least one looping pipe and a depth of the at least one descending pipe, and wherein the pressure is less than a dynamic pressure of the stream of water. Preferably, the at least one compressed air stored in the at least one compressed air storage tank is released as a plurality of exiting air bubbles at one or more locations along a hull of the nautical vessel; and wherein the plurality of exiting air bubbles reduce a friction between the nautical vessel and a water. The apparatus may further comprise: a plurality of pipes, wherein the plurality of pipes are connected to the at least one compressed air storage tank. The plurality of pipes have a plurality of valves, such that the plurality of valves are between the at least one compressed air storage tank and a plurality of openings of the plurality of pipes. Preferably, when one or more of the plurality of valves are opened the at least one compressed air passes through the one or more open valves and exits the plurality of pipes through the plurality of openings. The at least one compressed air exits as the plurality of bubbles. The apparatus for generating compressed air may be mounted within an interior of a hull of the nautical vessel, or it may be mounted on an exterior of a hull of the nautical vessel.

Another embodiment of the invention is an apparatus for generating compressed air on a nautical vessel, comprising: a first water intake opening; a first air injector; a first descending pipe; a first chamber; a first water outlet valve; a second compressed air storage tank; a second water intake opening; a second air injector; a second descending pipe; a second chamber; a second water outlet valve; and a second compressed air storage tank; wherein the first compressed air storage tank has a first air inlet valve; wherein the first air injector is comprised of a first air intake; wherein a first stream of water, generated by a motion of a nautical vessel, enters the first air injector and creates a first depression that pulls an air into the first stream of water; wherein a first plurality of air bubbles are formed in the first stream of water; wherein the first plurality of air bubbles is carried in the first stream of water down the first descending pipe to the first chamber; wherein the first stream of water and the first plurality of air bubbles separate in the first chamber forming a first separated air portion and a first water portion; wherein the first separated air portion is compressed by a first pressure of the first water portion; wherein the first compressed separated air portion passes through the first air inlet valve and into the first compressed air storage tank to form the first compressed air; wherein the second compressed air storage tank has a second air inlet valve; wherein the second air injector is comprised of a second air intake; wherein the first compressed air storage tank is connected to the second air intake such that the first compressed air is pulled into a second stream of water generated by the motion of the nautical vessel; wherein a second plurality of air bubbles are formed in the second stream of water; wherein the second plurality of air bubbles is carried in the second stream of water down the second descending pipe to the second chamber; wherein the second stream of water and the second plurality of air bubbles separate in the second chamber forming a second separated air portion and a second water portion; wherein the second separated air portion is compressed by a second pressure of the second water portion; and wherein the second compressed separated air portion passes through the second air inlet valve and into the second compressed air storage tank to form the second compressed air. Preferably, the first water portion exits the first chamber through the first water outlet valve; wherein the first pressure is determined by the water outlet valve and a depth of the first descending pipe; wherein the first pressure is less than a dynamic pressure of the first stream of water; wherein the second water portion exits the second chamber through the first water outlet valve; wherein the second pressure is determined by the first pressure, a depth of the second descending pipe, and the second water outlet valve; and wherein the second pressure is less than a dynamic pressure of the second stream of water. Preferably, the second compressed air stored in the second compressed air storage tank is released as a plurality of exiting air bubbles at one or more locations along a hull of a vessel; and wherein the plurality of exiting air bubbles reduce a friction between the vessel and a water. The apparatus for generating compressed air on a nautical vessel may further comprised of a plurality of pipes. The plurality of pipes are typically connected to the second compressed air storage tank. The plurality of pipes typically have a plurality of valves, such that the plurality of valves are between the second compressed air storage tank and a plurality of openings of the plurality of pipes. When one or more of the plurality of valves are opened, the second compressed air preferably passes through the one or more open valves and exits the plurality of pipes through the plurality of openings and the second compressed air exits as the plurality of bubbles. The apparatus may be mounted within an interior of a hull of the nautical vessel or it may be mounted on an exterior of a hull of the nautical vessel.

Another embodiment of the invention is an apparatus for delivering compressed air to the hull of a boat, comprising: one or more flexible ribbons; one or more compressed air storage tanks; one or more drums; and one or more air intake pipes; wherein the one or more flexible ribbons are comprised of a plurality of pipes, wherein the plurality of pipes have a plurality of holes; wherein the one or more drums are positioned on a bow of a nautical vessel above a water line; wherein the one or more flexible ribbons are wound around the one or more drum when not in use and are above the water line; wherein the one or more flexible ribbons are unwound from the one or more drums when in use and wherein the one or more flexible ribbon run substantially along a bottom of the nautical vessel; wherein a compressed air from the one or more compressed air storage tank is delivered to the one or more drums and then to the plurality of pipes, wherein the compressed air exits the plurality of holes as a plurality of air bubbles, and wherein the plurality of air bubbles reduce a friction between the nautical vessel and a water. Preferably, the apparatus further comprises one or more guiding rollers; and one or more electromagnets; wherein the one or more guiding rollers guide the one or more flexible ribbons into and out of the one or more drums; wherein the one or more electromagnets keeps the one or more unwound flexible ribbons attached to the nautical vessel when in use.

Another embodiment of the invention is an apparatus for reducing drag on a nautical vessel comprising: a channel; wherein the channel has one or more air injectors; a wide portion; wherein the wide portion is located at a bottom of the channel; a plurality of outlet holes; wherein a stream of water, generated by a nautical vessel's motion, enters the one or more air injectors and creates a depression that pulls an air into the stream of water; wherein the air is carried in the stream of water down the channel to the wide portion; wherein the stream of water and the air separate in the wide portion; wherein the air exits through the plurality of outlet holes; and wherein the apparatus is connected to a hull of a nautical vessel.

Preferably there is a plurality of channels. Alternatively, the air injectors may be fed air by an air fan.

The apparatus may further comprise a one or more bottom air injectors; a one or more bottom air injectors, wherein the stream of water, generated by the nautical vessel's motion, enters the bottom air injectors and creates a bottom depression that pulls an air that has not exited through the plurality of outlet holes into the stream of water creating a mixture of air bubbles and water. The mixture of air bubbles and water exits the bottom air injectors and lubricates a bottom of the nautical vessel. Alternatively, the one or more bottom air injectors provide additional pressure on the air such that the air is forced out of the plurality of outlet holes. The bottom air injectors may be fed by an air fan. The air exiting the plurality of holes preferably reduces a drag on a hull of a nautical vessel as the nautical vessel moves through a body of water. The stream of water and the air that is carried down the channel is directed into one or more air cavities and the air replenishes the air contained in the one or more air cavities.

The apparatus is preferably removably connected to the vessel hull.

Alternatively, the apparatus may be permanently attached to the vessel hull.

The vessel may be a small vessel.

Another embodiment of the invention is a drag reducing nautical vessel hull comprising: a hull; wherein the hull has a channel; wherein the channel is on a front portion of the hull; wherein the channel has one or more air injectors; a wide portion; wherein the wide portion is located at a bottom of the channel; a plurality of outlet holes; wherein a stream of water, generated by a nautical vessel's motion enters the one or more air injectors and creates a depression that pulls an air into the stream of water; wherein the air is carried in the stream of water down the channel to the wide portion; wherein the stream of water and the air separate in the wide portion; and wherein the air exits through the plurality of outlet holes.

The hull preferably has a plurality of channels. The air injectors may be an air fan.

The one or more air injectors may be on an adjustable frame that allows the one or more air injectors to be adjusted between a high water line and a low water line.

The drag reducing nautical vessel hull may further comprise one or more bottom air injectors. The bottom air injectors provide additional pressure on the air such that the air is forced out of the plurality of outlet holes. The bottom air injectors may be fed by an air fan. The air exiting the plurality of holes reduces a drag on a hull of a nautical vessel as the nautical vessel moves through a body of water. The stream of water and the air that is carried down the channel may be directed into one or more air cavities and the air replenishes the air contained in the one or more air cavities.

The nautical vessel may be a small vessel and the air injector may be on a bottom of the nautical vessel and just under the water line.

Another embodiment of the invention is a vessel hull bow adaptor that modifies the bow of a vessel such that it presents substantially horizontal surfaces on a transverse axis at the descending part of the bow such that air bubbles released by the air injectors are carried in vast amounts under the vessel's hull. These air bubbles lubricate the descending bow as well as the bottom of the vessel. The water inlets of the air injectors should be placed just under the water line in front of the bow or may even be embedded in the bow, such that they do not protrude outside of the silhouette of the vessel seen from the incoming stream. In this manner the air injectors do not produce or generate additional drag. As such, there is no penalty, and no additional energy is wasted to generate the bubbles, beyond the energy needed to push the silhouette through water. Because the bow is lubricated by the bubbles as well, the effect of the lubrication substantially outweighs any impact from adding the invention to a vessel hull.

The drag reducing nautical vessel hull for a small vessel may have one or more air injectors that are adapted to fit onto a bow of the small vessel hull. The stream of water and the plurality of bubbles exits the one or more air injectors and flows down both the bow and the bottom side of the vessel hull, such that the plurality of bubbles lubricate both the bow and the bottom side of the vessel hull. Preferably, the low draft and slight slope of the bow easily allows this lubricating effect. Preferably, the small craft has a smooth flat transversally slope for the bubbles to wash down and under.

Another embodiment of the invention is a drag reducing nautical vessel hull for a small vessel comprising: a vessel hull; wherein the hull has one or more air injectors and one or more outlet holes; wherein the one or more air injectors comprise one or more water inlets and one or more air inlets; wherein the one or more air injectors are located substantially at an underside of the vessel hull; wherein a stream of water, generated by a vessel's motion, enters the one or more air injectors through the one or more water inlets, which is located just under a water line, and creates a depression that pulls an air from the one or more air inlets into the stream of water; wherein a plurality of air bubbles are formed in the stream of water; wherein the stream of water and the plurality of air bubbles exits through the one or more outlet holes; wherein the plurality of air bubbles lubricate the bottom side of the vessel hull as the vessel moves through the stream of water. The air that forms a plurality of air bubbles may be provided by an air fan. Preferably the nautical vessel in this embodiment is a small watercraft. A small watercraft may be as small, or smaller than, a single person water ski, small windsurf, surf, or kayak. Alternatively, the small watercraft may be much larger.

Another embodiment of the invention is a method of using the present invention to provide air bubbles to the bottom of a vessel through the present invention.

It is an object of the present invention to overcome the limitations of the prior art.

The object of the present invention to provide various means to generate the necessary volumes of compressed air without using the additional fuel needed by compressors. Instead, the necessary energy to compress air is taken from the dynamic pressure exercised on the hull by the water while sailing.

Another, and very important object of this invention, is to provide methods and devices for efficiently injecting high volumes of air bubbles capable of lubricating the bow as well as the bottom of a boat. This can be accomplished by adequately adapting the bow side of large vessels to guide the air bubbles released by an adjustable up and down frame that distributes the bubbles just under the waterline, downwards and along the bottom of the hull thus lubricating the descending bow and the bottom. The air releasing frame can be pulled out of water when stationed to prevent fouling. This kind of a detachable frame is preferably attached to barge or flat bottom vessels without any modifications of their hulls. The air releasing-slit may be incorporated in an adjustable frame or apron, adapted to be attached to half submerged vessels such as motor yachts and sail boats or it may fully incorporate air injectors as would be the case for wind surfs and other types of surfs, jet skis, or wave runners.

One of the problems that the present invention solves is how to produce the high volumes of bubbles needed and how to release the bubbles at the proper places so that they have the optimal lubricating effect. This lowers the friction coefficient between the boat hull and the water and thus, lowers the resistance opposed to the boat hull as it moves through the water.

Another problem that the invention solves is how to place the bubbles along the bottom of a vessel without the aid of a high power consuming air compressor.

DETAILED DESCRIPTION OF THE DRAWINGS

Figure 1:
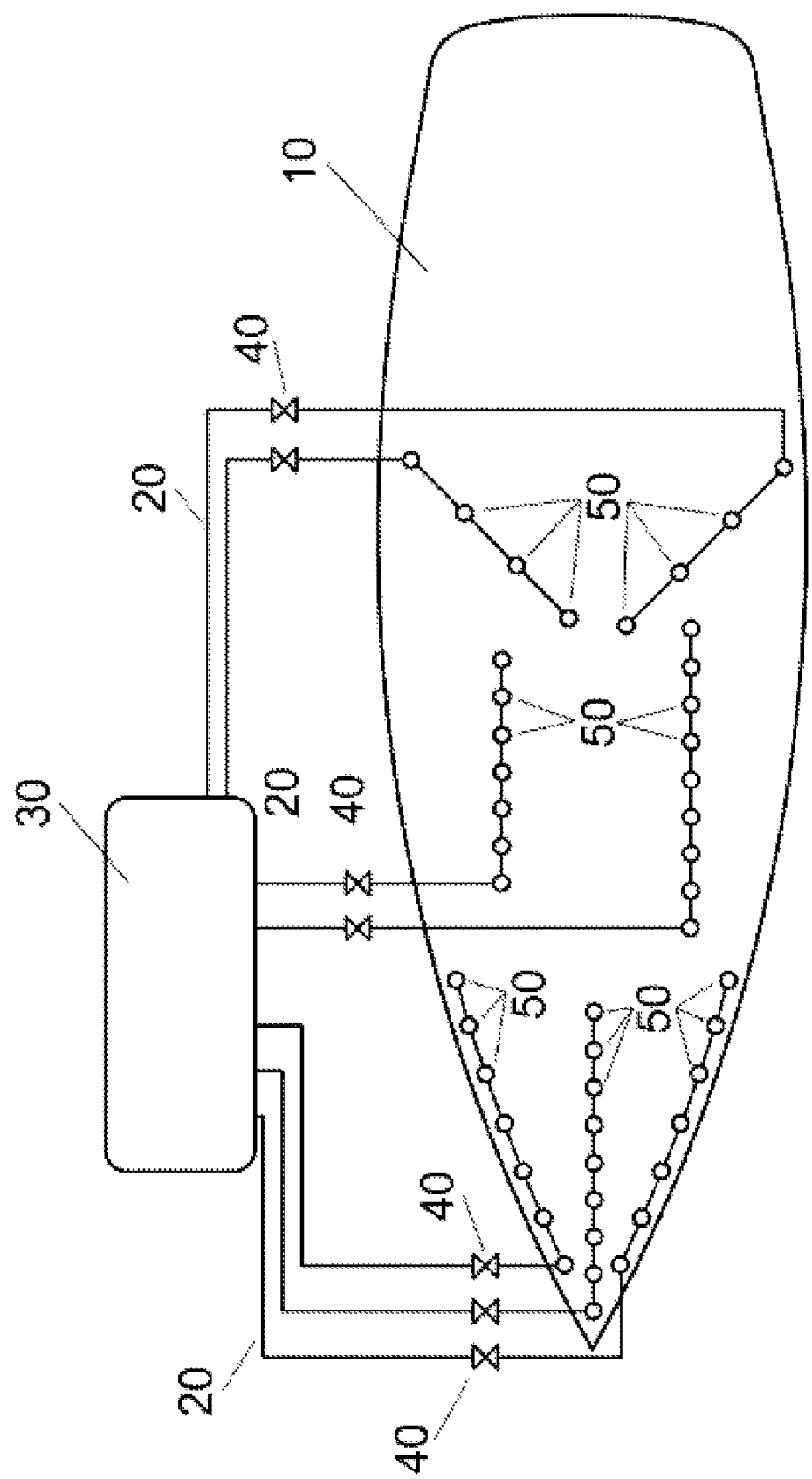
FIG. 1 is an illustration of a bottom view of one embodiment of the invention and shows a system of pipes for delivering bubbles to the hull of a vessel.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. For instance, "Venturi Effect" or "Venturi pipe" refers to the well known concept of a reduction in fluid pressure that results when a fluid flows through a constricted section of tube, channel, or pipe. The constricted area causes a depression in the pressure which draws in higher pressure air into the lower pressure water. "Nautical vessel" refers to any craft, of any size, made out of any type of materials, which travels in or on any body of water, including, but not limited to rivers, streams, lakes, ponds, oceans, or seas. The term "air fan" refers to any low power motor that moves air, such as a blower, fan, or centrifugal fan. The term "air injector" refers to device that causes a venturi effect depression in the water, such that adjacent air is sucked into the water in the form of bubbles. An air injector is well known in the art of the whirlpool industry. Alternatively, the air injector may be a Venturi pipe (or tube) in which water enters through a wide opening, gets squeezed in a narrow portion where a depression is created, air is drawn in from a provided air intake, and a mixture of water with air bubbles exits the enlarged exit.

The submerged bodies of nautical vessels are subjected to drag due to friction with water. The friction can greatly be reduced if, in the immediate boundary layer, air bubbles are placed between the water and the hull. The efficacy of the air bubbles have been demonstrated in both laboratory and full scale tests.

Because air bubbles released at the front end or bow of a vessel have a tendency to migrate and dissipate, they need to be constantly replenished. In order to accomplish the replenishment of the air bubbles, especially in deeper boat hulls, vast amounts of compressed air are needed to overcome the static water pressure. The present invention is a means to provide vast amounts of compressed air to replenish the bubbles that are lost to the sides or are otherwise washed away. The compression force for generating the compressed air comes from the dynamic pressure of water on the hull of the boat as the boat moves through the water.

FIG. 1 is an illustration of a bottom view of one embodiment of the invention and shows a system of pipes for delivering bubbles to the hull of a vessel. FIG. 1 shows that the compressed air has already been captured in compressed air storage tank 30, which may be located anywhere on nautical vessel 10. Once the compressed air is captured, the air may be replenished to any part of the vessel or it may be distributed to barges that follow the main vessel or latter parts of a very long vessel. FIG. 1 shows that the compressed air is preferably distributed to the bottom of vessel 10 though pipes 20. The valves 40 are controllably opened and closed, allowing the compressed air to be released through holes 50. Using the system of pipes 20, shown in FIG. 1, the compressed air may be selectively and controllably delivered to the bottom of the vessel 10. The valves 40 may be manually controlled or controlled via a computer.

Figure 2:
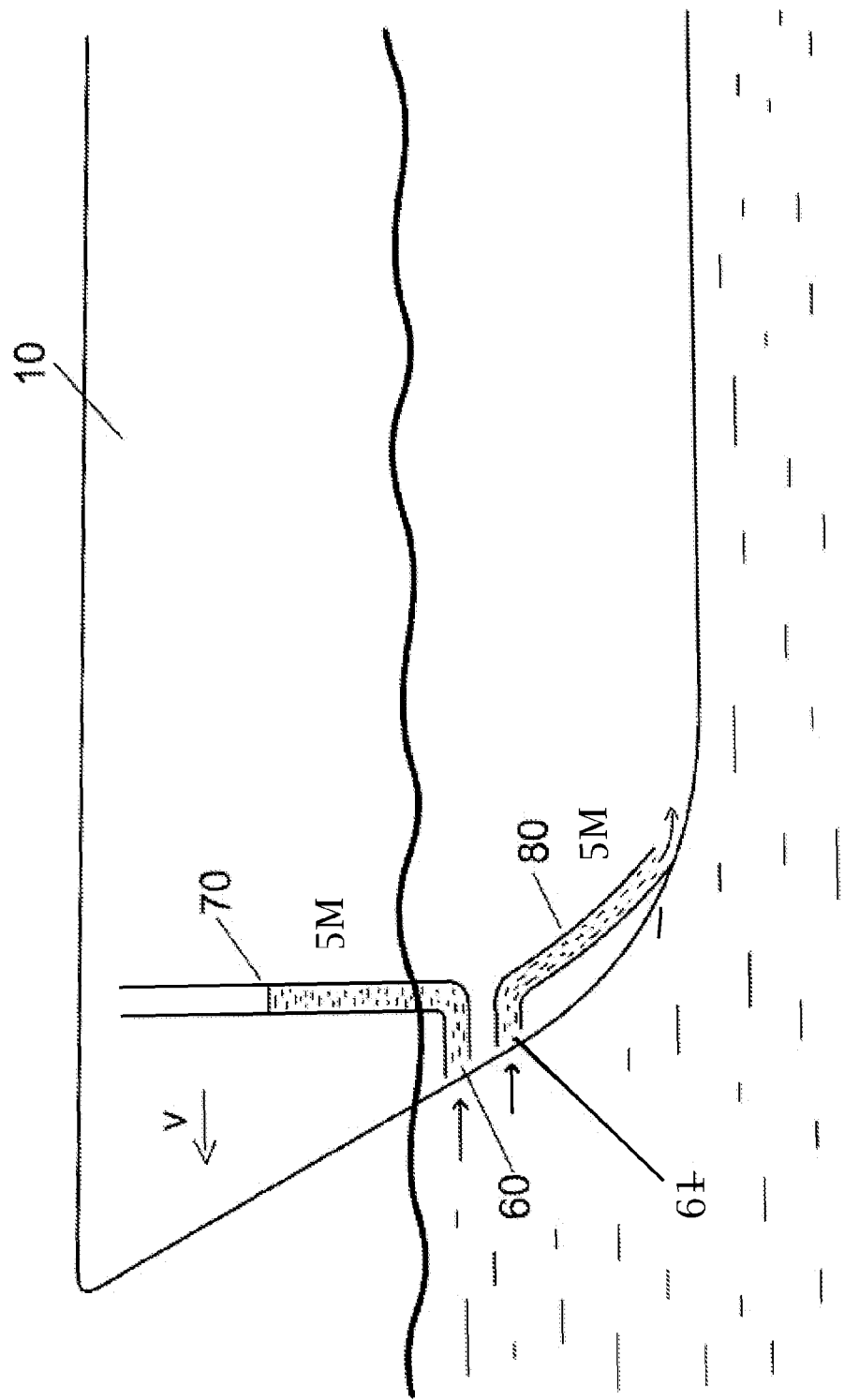
FIG. 2 is an illustration of a side view of one embodiment of the invention and shows dynamic pressure caused by vessel movement.

FIG. 2 is an illustration of a side view of one embodiment of the invention and shows dynamic pressure caused by vessel movement. The dynamic pressure of water exercised on the frontal silhouette of the bow of the nautical vessel is $P=Q/2*v^2$. P is pressure and is in Pascals. Q is the water density and is generally 1000 Kg/cubic Meters (M). v is velocity and is in M.

For example, if the speed (or velocity) of the nautical vessel is ten meters per second (10M/sec), which is the equivalent of 20 knots, 10 squared=100, 1000 divided by 2=500, 500 times 100=50,000 Pascals. 50,000 Pascals is 0.5 At, which is equal to 5 M Water column.

FIG. 2 shows that if vessel 10 moves at 10M/sec, water entering opening 60 would be able to rise five (5) meters in pipe 70, and water entering opening 61 would be forced downward five (5) meters, until the dynamic pressure equals the static pressure at that low level. The water entering pipe 70 will stay at five (5) meters in height for as long as the speed or velocity of the boat does not change. The water will exit pipe 80 only if the difference between the level of the input and the output of pipe 80 is less than five (5) meters. Part of the dynamic pressure, which must be overcome by the engine consuming fuel for the vessel to move forward with the desired speed, can be used to compress air necessary for the hull lubrication as detailed herein.

Figure 3A:
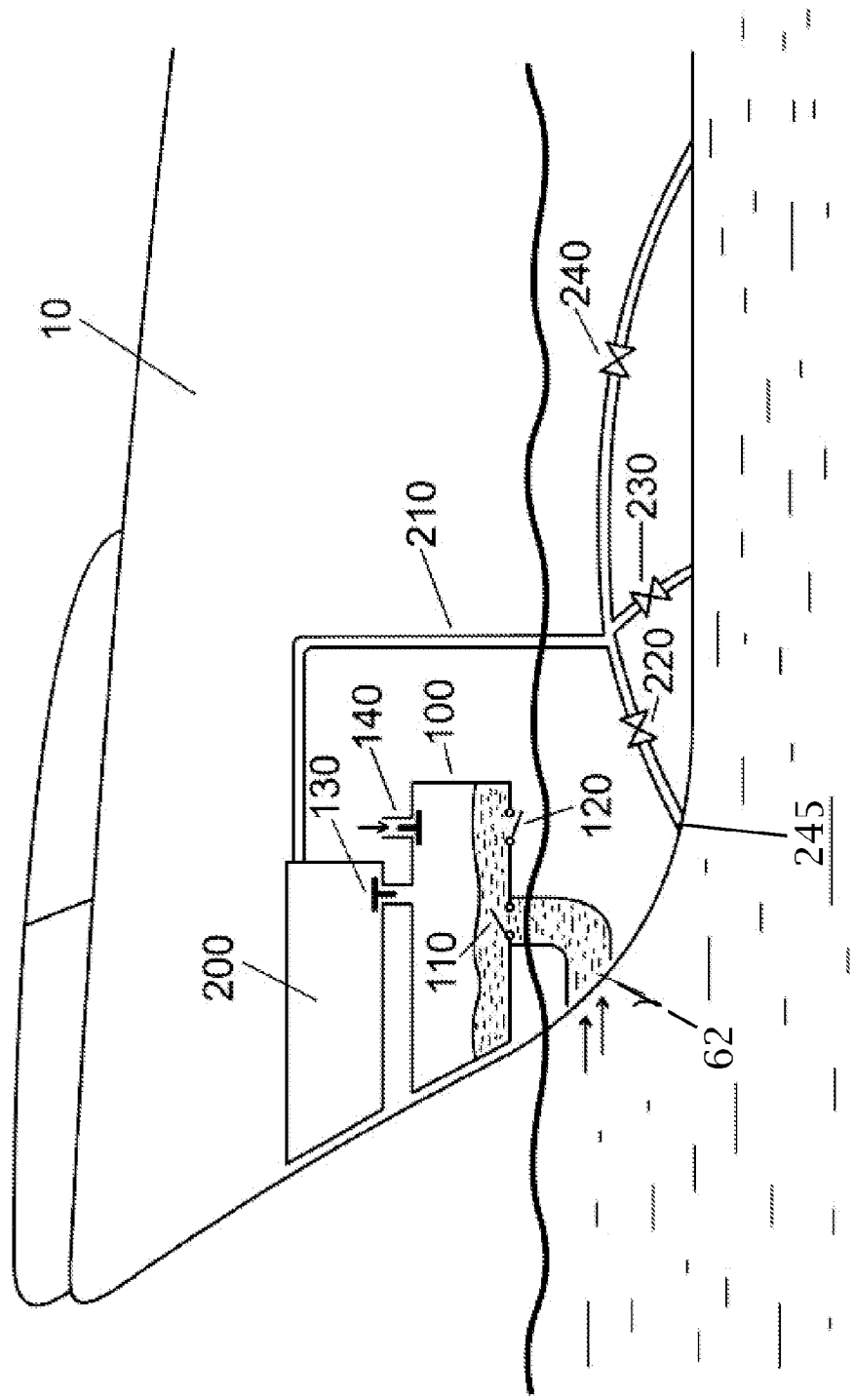
FIG. 3a is an illustration of a side view of one embodiment of the invention and shows a water piston generating compressed air.

FIG. 3a is an illustration of a side view of one embodiment of the invention and shows a water piston generating compressed air. The apparatus shown in FIG. 3a may be used if the cruising speed is higher than the draft of the vessel 10, as would be the case with most pleasure motor yachts, fast ferryboats, passenger carriers, or navy and coast guard vessels. As shown in FIG. 3a, the water in which the vessel 10 is sailing enters opening 62 passes through valve 110, which is preferably a one way water intake or inlet valve, and raises the water level in water piston 100. Water exit or outlet valve 120 is typically kept closed while building up the water pressure in water piston 100. The air trapped on top of the water in water piston 100 is compressed and passes through the air outlet or exit valve 130, which is preferably a one way valve. The compressed air is stored in compressed air storage tank 200. Air inlet or intake valve 140, which is preferably a one way valve, is preferably kept closed when valve 130 is open. When the water level in piston 100 reaches a threshold or maximum level, valve 110 closes and valve 120 opens, allowing the water to flow out. In doing so, a depression is created which is filled when valve 140 opens and allows fresh, non-compressed air from the atmosphere to fill the water piston 100. When the water piston 100 is emptied of water, the compression cycle starts again by closing valves 120 and 140 and opening valve 110. The apparatus shown in FIG. 3a generates large quantities of compressed air that are first stored in compressed air storage tank 200 and then delivered to the bottom of vessel 10 through pipes 210 and valves 220, 230, 240 as needed to various releasing points, including holes 245. Preferably, water piston 100 is above the water level such that the water in the water piston can be discharged periodically. Importantly, the compressed air storage tank 200 may be located anywhere. As shown in FIG. 3a, the apparatus is preferably within the hull of vessel 10.

If vessel 10 is traveling at a velocity of 10M/sec, then the water piston 100 preferably has its height set to one (1) meter above sea level/water level. Given these dimensions, the compression power of the water piston 100 is 5M−1M, or 4M water column. Therefore, the compressed air would be able to lubricate only drafts of less than 4M.

Valves 110, 120, 130, and 140, may be automatically actuated under the controls of sensors that detect, at least, the full and empty stages of the piston 100, or they can be actuated by a floating component. Because valve 110 is preferably open while valve 120 is closed, and vice versa, a hydraulic piston, or any mechanical mechanism, may be used to switch the valves. Indeed, the hydraulic piston may even use the same dynamic pressure given by the vessel's motion.

Figure 3B:
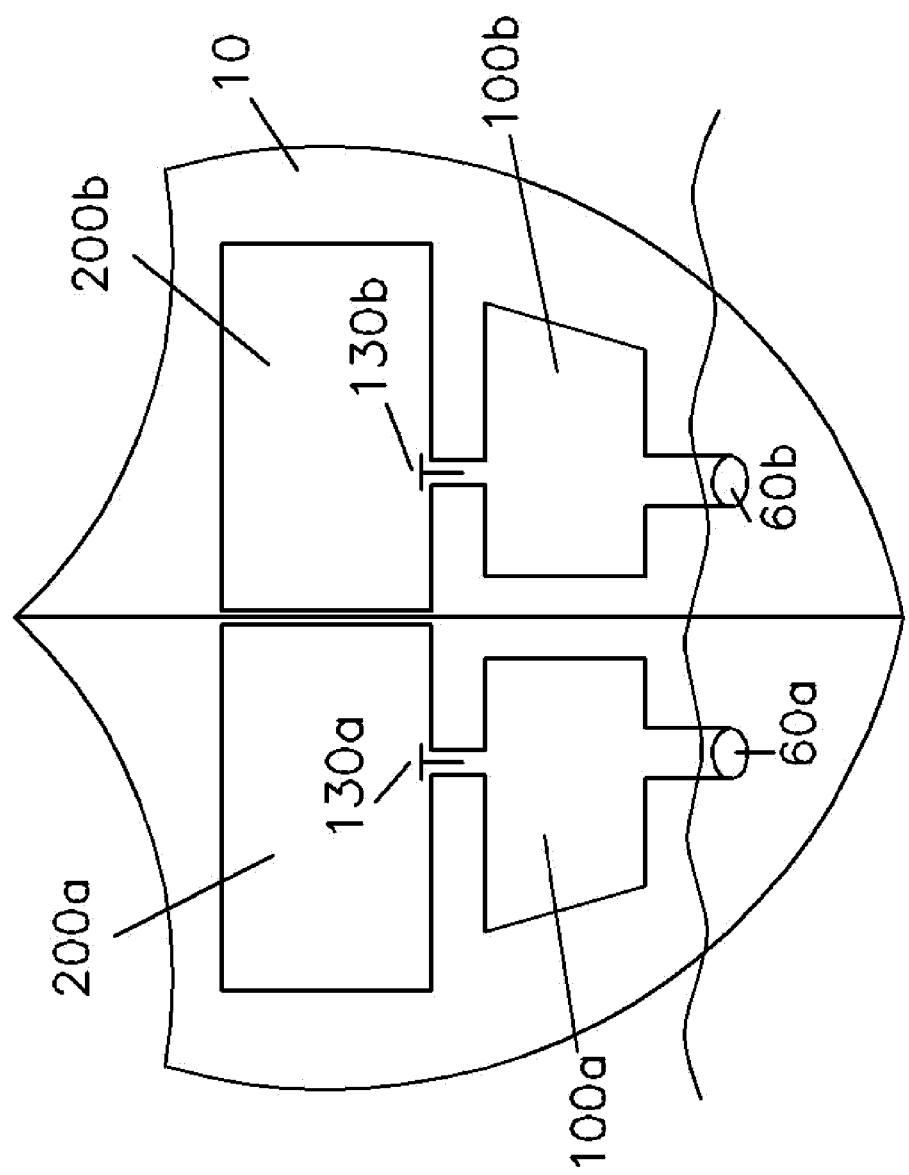
FIG. 3b is an illustration of a front view of one embodiment of the invention and shows two water pistons generating compressed air.

FIG. 3b is an illustration of a front view of one embodiment of the invention and shows two water pistons generating compressed air. As shown in FIG. 3b, there are preferably multiple water pistons 100a and 100b. FIG. 3b shows how the compression apparatuses may be attached to an exterior of the hull of vessel 10. Multiple pistons 100a and 100b are desired because while one piston is discharging water, other piston(s) are in the active cycle of compressing air. Preferably, the water pistons 100a and 100b are large enough such that the total volume of compressed air is sufficient to cover the surface area needed by the lubricating network.

FIG. 3b shows that vessel 10 is preferably comprised of pistons 100a and 100b, which may have the same opening or may have separate openings 60a and 60b. Once the air is compressed, it enters compressed air storage tanks 200a and 200b through air outlet valves 130a and 130b.

Figure 4:
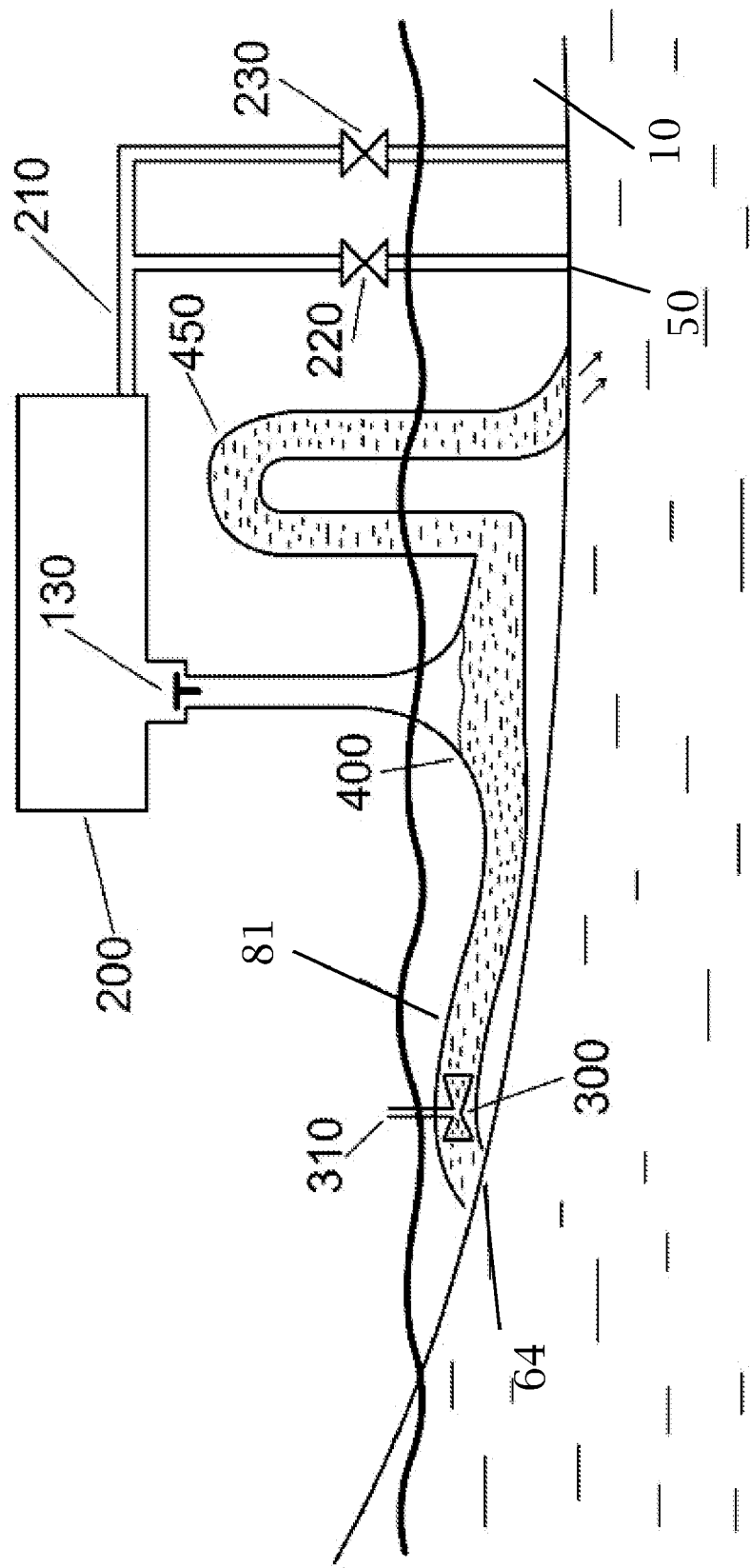
FIG. 4 is an illustration of a side view of one embodiment of the invention and shows a looping pipe and air injector generating compressed air.

FIG. 4 is an illustration of a side view of one embodiment of the invention and shows a looping pipe and air injector generating compressed air. The apparatus in FIG. 4 shows an embodiment that may be used with vessels that are not traveling fast enough to use the embodiment shown in FIGS. 3a and 3b. FIG. 4 shows that the apparatus in or on vessel 10 preferably is comprised of opening or inlet 64, air injector or venturi pipe 300, venturi air intake 310, descending pipe 81, chamber 400, looping pipe 450, compressed air storage tank 200, pipes 210, and valves 220, 230. FIG. 4 shows how air injector 300 is held just under the water level within opening 64. A stream of water enters opening 64 and is driven downward because the dynamic pressure is higher than the static pressure at the pipe's exit. As the stream of water passes the air injector venturi pipe 300, air is pulled through intake 310 at atmospheric pressure. The stream of water with entrained air bubbles travels down descending pipe 81. The water and air travels to enclosed larger chamber 400, where bubbles may separate on top of the water. The separated air has the same pressure as that of the water in the chamber 400. The pressure in the chamber is dictated by the height of the looping pipe 450, through which the water exits the system and the depth of descending pipe 81. Looping pipe 450 has to be large enough to allow freely the water to exit, but the pressure inside the chamber 400 is given by adding the depth of the entrance of pipe 81 into the separating chamber 400 with the height of the looping pipe 450. This pressure should be smaller than the dynamic pressure of the incoming stream. Using the previous example of a 5M water column dynamic pressure, a looping pipe 450 height of 3M, and pipe 81 descends by 1M, the pressure in the chamber 400 is 3M+1M=4M water column Consequently, this is the pressure of the air in chamber 400. This compressed air passes through valve 130 and is stored in compressed air storage tank 200. From there, the compressed air can be distributed through pipes 210 and through valves 220, 230. In other embodiments, the looping pipe 450 can be replaced by an adjustable pressure valve, which would adjust the pressure in the chamber 400 as needed and allow the water to exit freely as needed. When the water pressure in the chamber 400 is greater than desired, the water overcomes the adjustable pressure valve and exits the system.

Chamber 400 can also be located above the water level, but the elevation height above the water level would need to be deducted from the attained pressure inside the chamber 400 instead of being added to it when it is below sea level. The air compression embodiment shown in FIG. 4 is still limited and dependent on the speed of the vessel, i.e. the dynamic pressure of the incoming stream. The drafts of larger vehicles, when fully loaded, are generally too large for a single chamber air compression apparatus. For these vehicles a progressive multi-step air compression system can be employed.

Figure 5:
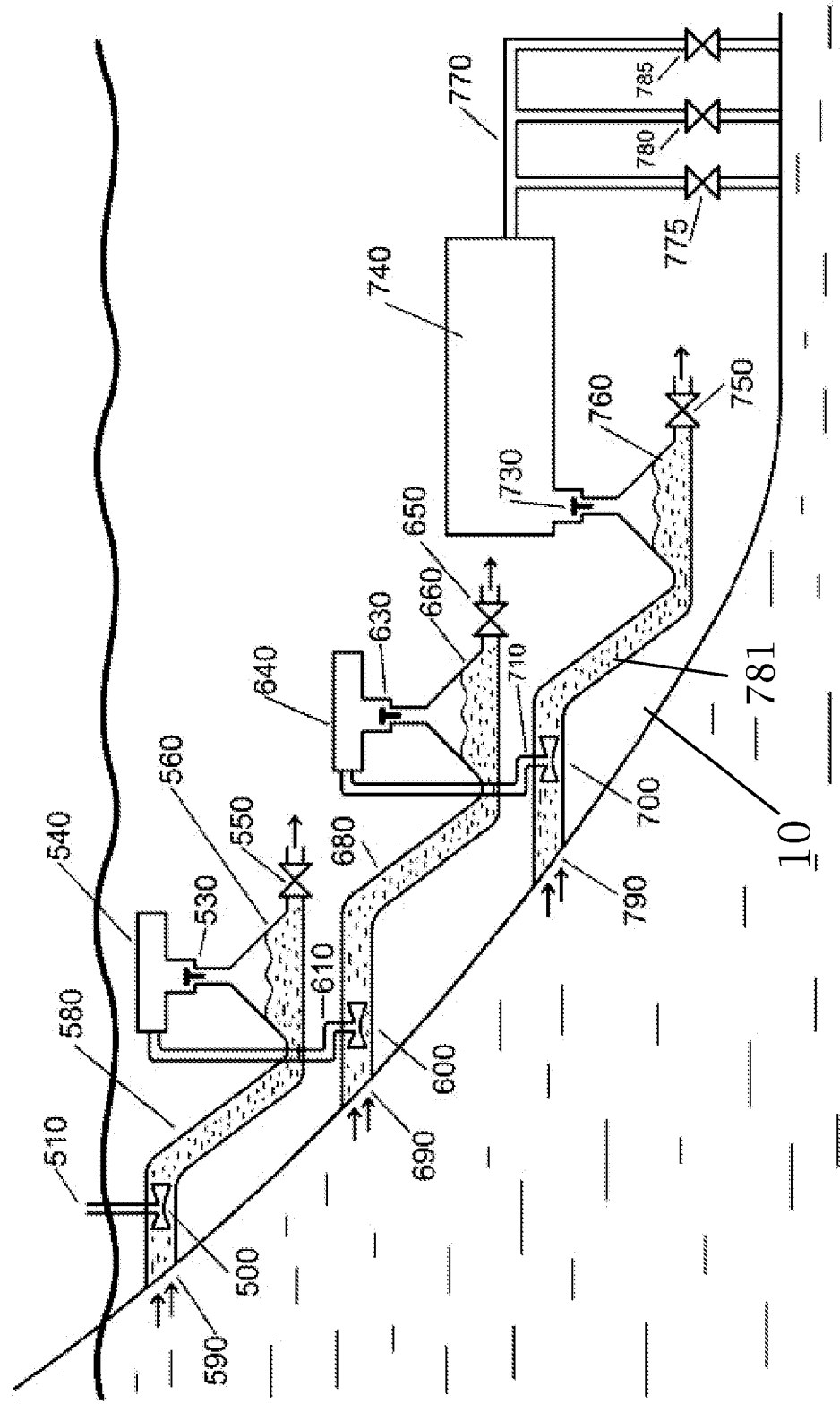
FIG. 5 is an illustration of a side view of one embodiment of the invention and shows a multi-step air compression system.

FIG. 5 is an illustration of a side view of one embodiment of the invention and shows a multi-step air compression system. As shown in FIG. 5, the air compression apparatus on vessel 10 preferably includes first water intake opening 590, second water intake opening 690, and third water intake opening 790, first air injector 500, second air injector 600, third air injector 700, first descending pipe 580, second descending pipe 680, third descending pipe 780, first air intake 510, second air intake 610, third air intake 710, first chamber 560, second chamber 660, third chamber 760, first compressed air tank intake valve 530, second compressed air tank intake valve 630, third compressed air tank intake valve 730, first water outlet valve 550, second water outlet valve 650, third water outlet valve 750, first compressed air storage tank 540, second compressed air storage tank 640, third compressed air storage tank 740, pipes 770, and valves 775, 780, and 785. As shown in FIG. 5, in the first stage or step of the multi-step air compression system, water and air enter descending pipe 580 through opening 590, which is just under the water surface. First air intake venturi pipe 500 draws air from atmospheric pressure drawn through air intake pipe 510 and mixes it in the stream of water as a plurality of air bubbles going downwards in descending pipe 580 to first separating chamber 560. The air is drawn due to the fact that a depression is created in the air injector venturi pipe 500. The depression is higher than the static pressure of water at the small depth where the opening 590 and air injector venturi pipe 510 are. The amount of air sucked into the stream of water is dependent on the speed of the stream of water and of the pressure differential between the input and output of the air injector venturi pipe 500. Because it is preferred that a large amount of air is entrained in the first stream of water, air injector venturi pipe 500 is preferably held inside pipe 580, which has a larger diameter, such that the pressure differential between its input and output is small, which favors a great amount of air to be drawn in the water stream.

Once the stream of air bubbles and water arrive in chamber 560, which is larger than descending pipe 580, the air separates on top of the water as compressed air. The compressed air passes through air inlet or intake valve 530 and enters the first compressed air storage tank 540. Preferably, the water exits through first water outlet valve 550, which replaces looping pipe 450 of FIG. 4. The valve 550 determines the pressure in separating chamber 560. Preferably, this pressure is less than the dynamic pressure of water entering the chamber, otherwise the system will not work because water will not enter into the chamber.

Typically, the pressure of air in the first compressed air storage tank 540 it is not high enough to exit the bottom of the vessel 10 and lubricate or reduce the friction on the bottom of the vessel in FIG. 5. Thus, further stages of compression may be used to further compress the air. As shown in FIG. 5, the second stage starts when the compressed air in tank 540 is pulled into the second descending stream of water through second air injector 600. Water from a deeper level enters second opening 690, which holds air injector 600. Although air from the surface would not have been able to be injected into second descending pipe 680, the compressed air from tank 540 is readily entrained in the second stream of water. Next the second stream of water and air bubbles passes through descending pipe 680, enters separating chamber 660, where the air bubbles out as further compressed air. The compressed air passes through air intake valve 630, which is preferably a one way valve, and is stored in second compressed air storage tank 640. The water exits out of water outlet valve 650. The stages may be repeated as many times as needed or desired. The compressed air in tank 640 may be further compressed by entraining the air through third air injector venturi 700. The water enters the third opening 790, pulls air from intake 710, travels down descending pipe 781, and goes into chamber 760. The further compressed air bubbles separate in chamber 760 and are stored in third compressed air storage tank 740. FIG. 5 shows how the separated air captured in compressed air storage tank 740 is distributed to lubricate the bottom or any chosen part of the vessel through valves 775, 780, 785 as desired.

Depending on the cruising speed and the draft of the vessel 10, the appropriate number of stages will be employed to ensure that there is enough air at the proper pressure. Having enough air compressed to the proper pressure in the compressed air tank is the first step in reducing the friction of the vessel 10 as it sails. The second step is providing an apparatus for distributing the air on the hull of the vessel 10.

Figure 6:
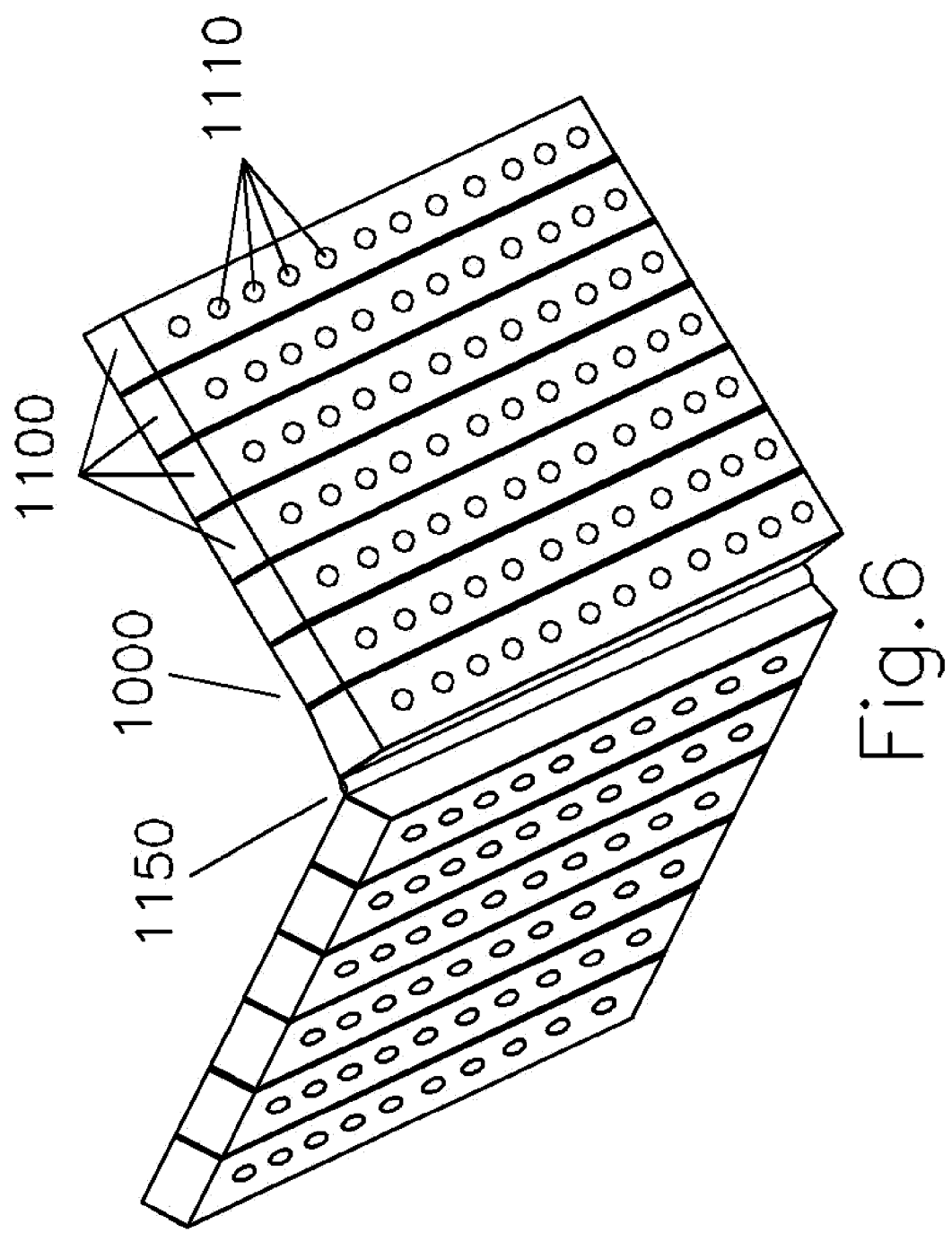
FIG. 6 is an illustration of a perspective view of a portion of one embodiment of the flexible ribbon of the invention.

FIG. 6 is an illustration of a perspective view of a portion of one embodiment of the flexible ribbon of the invention. FIG. 6 shows that the compressed air delivery apparatus 1000 is preferably comprised of a plurality of pipes 1100. Each pipe has a plurality of holes 1110. As shown in FIG. 6, the compressed air delivery apparatus 1000 is preferably a flexible and rollable ribbon. If the compressed air delivery apparatus 1000 is attached to a small vessel, which tend to have a V-shaped hull, the compressed air delivery apparatus 1000 may have a central thinner section 1150, which is able to bend at various angles, similar to a hinge, around the point of the V-shaped hull.

The numerous small holes 1110, through which the compressed air stored in the compressed air storage tanks are released, are prone to fouling and clogging if the holes remain submerged when the vessel is in wet dock. Although various methods may be used to prevent the holes 1110 from clogging, such as blasting air through the holes using an air compressor or scraping off the foul manually, these methods are expensive and/or use a large amount of energy. The compressed air delivery apparatus 1000 shown in FIG. 6 prevents clogging by being easily removed from the water when the vessel docks. Specifically, the compressed air delivery apparatus 1000 is rolled onto a drum when at dock and unrolled and placed in position when the vessel is to sail.

Figure 7:
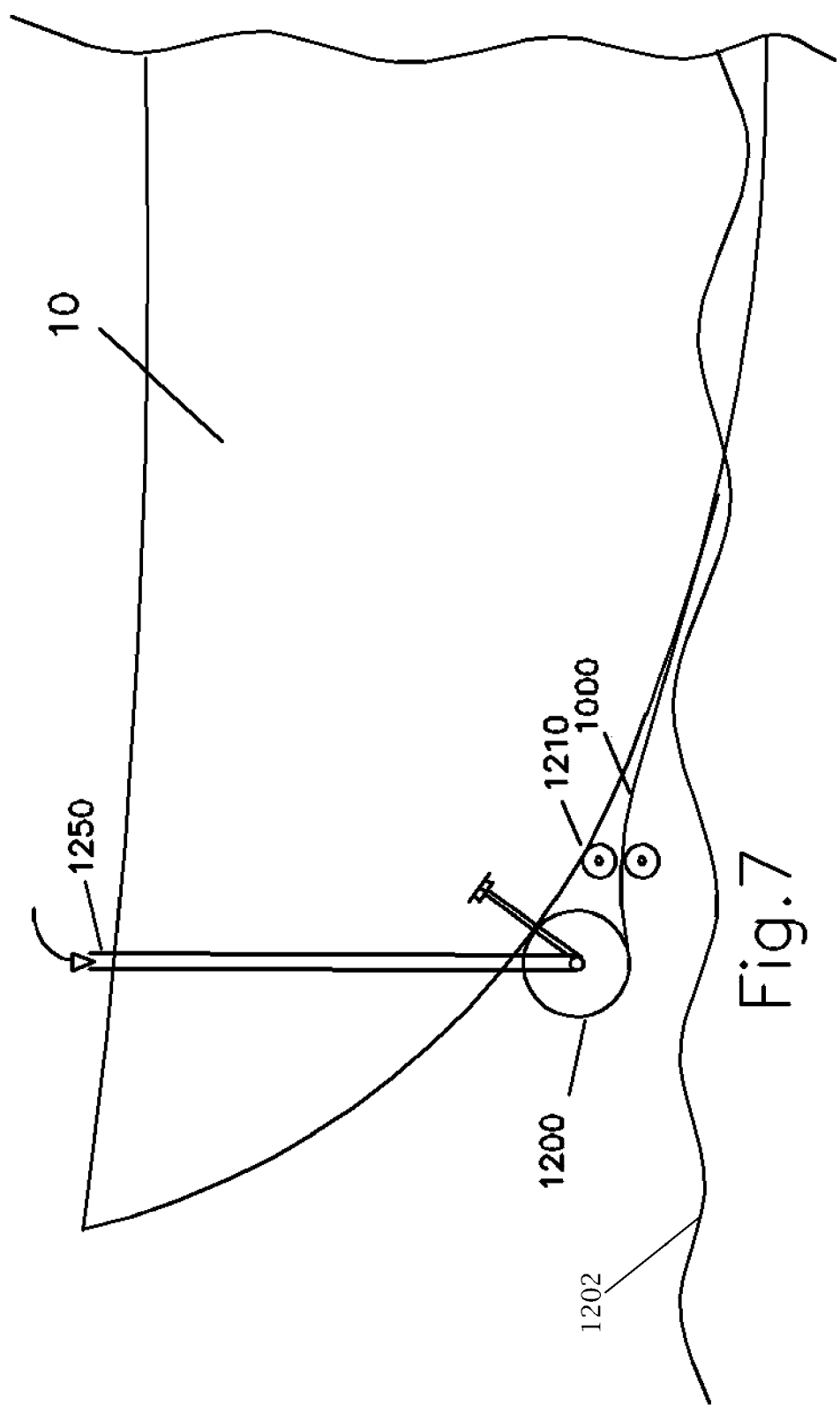
FIG. 7 is an illustration of a side view of one embodiment of the invention and shows the ribbon being unwound from the drum.
Figure 8:
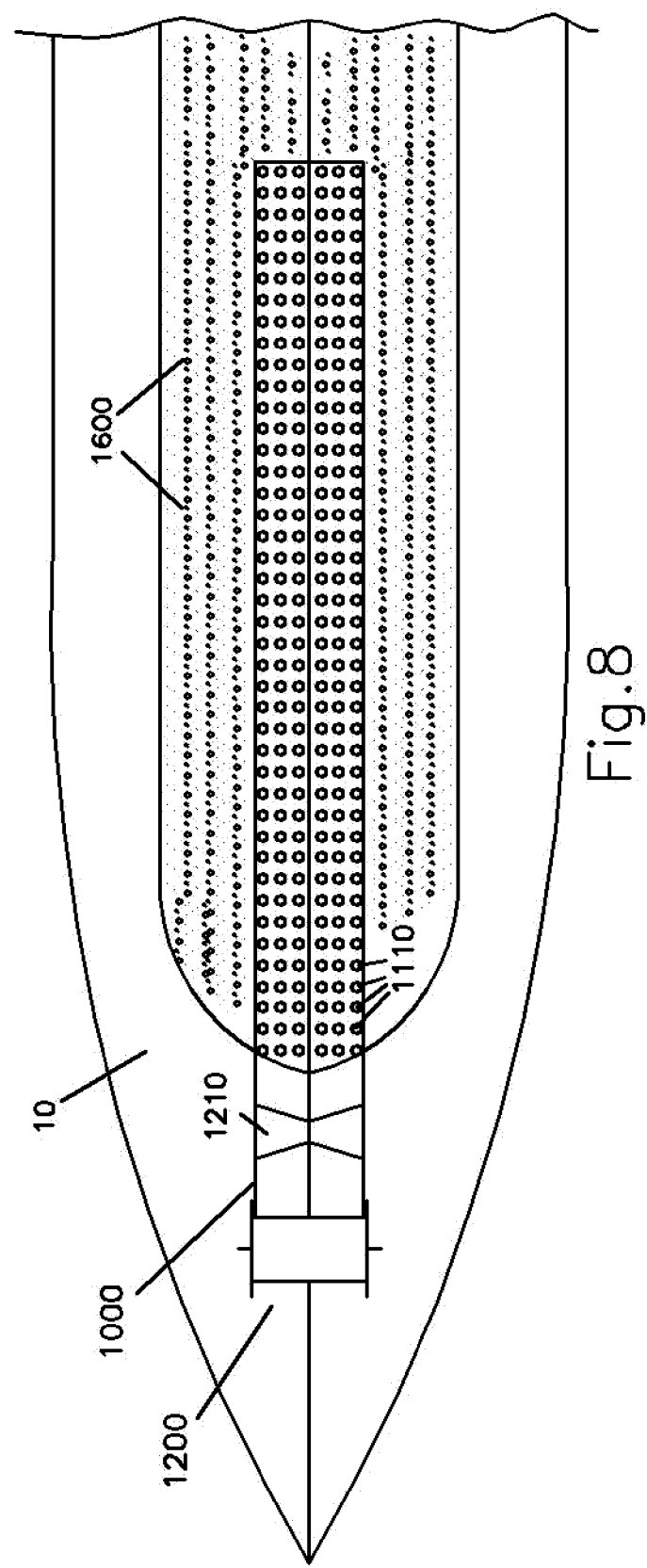
FIG. 8 is an illustration of a bottom view of one embodiment of the invention and shows the ribbon unwound and delivering bubbles to the bottom of a vessel hull.
Figure 9:
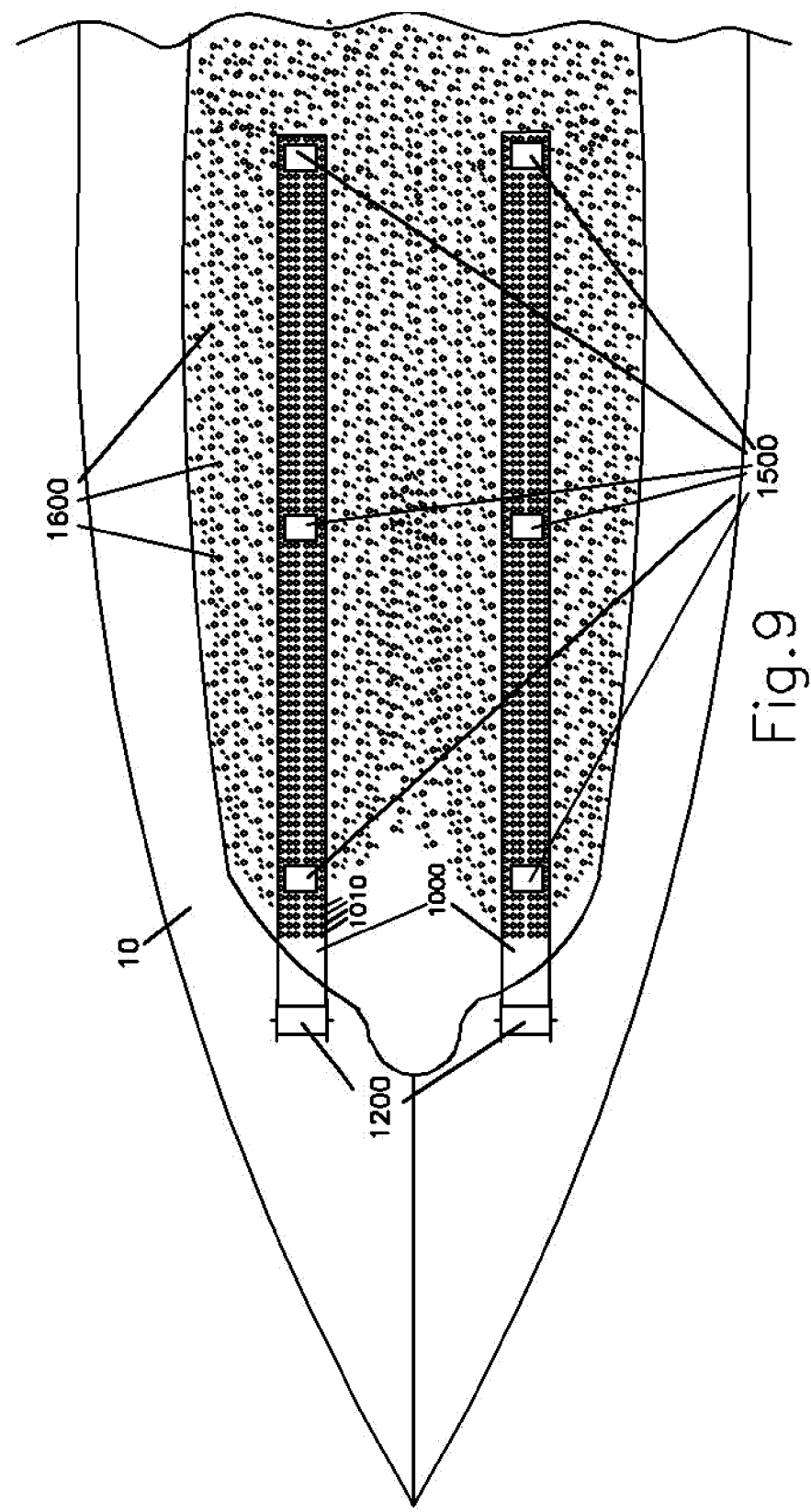
FIG. 9 is an illustration of a bottom view of one embodiment of the invention and shows two ribbons unwound and delivering bubbles to the bottom of a vessel hull.

FIG. 7 is an illustration of a side view of one embodiment of the invention and shows the ribbon being unwound from the drum. As shown in FIG. 7, the compressed air delivery apparatus 1000 is being unwound from drum 1200 to cover a portion of the hull of vessel 10. FIG. 7 shows how the drum 1200 is preferably affixed to the bow of vessel 10 above the water level 1202. FIG. 7 also shows how guiding rollers 1210 preferably help unwind and retract the compressed air delivery apparatus 1000 in an even and smooth manner. Drum 1200 and guiding rolls 1210 are preferably motor driven and powered by the vessel's battery. When sailing, the stream of water will pull the ribbon shaped compressed air delivery apparatus 1000 under the hull as much as the drum 1200 and guiding rollers 1210 allow. Preferably, compressed air is provided to the drum 1200 through pipes 1250 from the compressed air storage tanks, which might be situated anywhere vessel 10 (as shown in FIGS. 1, 3a, 3b, 4, and 5). The compressed air is then fed to pipes 1100 to be released through the holes 1110 as shown in FIGS. 6, 8, and 9). The presence of air in pipes 1100 will make them buoyant and add to the tendency of the ribbon shaped compressed air delivery apparatus 1000 to adhere or remain proximate to the bottom of the hull.

When the vessel 10 is docked, the drum 1200 and guiding rollers 1210 wind or retract compressed air delivery apparatus 1000 so that it is substantially removed from the water.

FIG. 8 is an illustration of a bottom view of one embodiment of the invention and shows the ribbon unwound and delivering bubbles to the bottom of a vessel hull. As shown in FIG. 8, the compressed air delivery apparatus 1000 is unwound from drum 1200 and guiding rollers 1210. The holes 1110 are placed along the hull of the vessel 10 and when compressed air is supplied to compressed air delivery apparatus 1000, microbubbles 1600 lubricate the hull and reduce the friction of the vessel 10 as it sails through the water.

FIG. 9 is an illustration of a bottom view of one embodiment of the invention and shows two ribbons unwound and delivering bubbles to the bottom of a vessel hull. For larger vessels with flat bottoms, more than one ribbon shaped compressed air delivery apparatus 1000 is preferably used. FIG. 9 shows that two compressed air delivery apparatus 1000 have been unwound from drums 1200. An attachment mechanism is preferably used to keep multiple compressed air delivery apparatuses 1000 in place because: (1) longer sections of the compressed air delivery apparatuses 1000 have to be unwound to have the desired lubricating effect on the long hulls; and (2) the off-center positioning of the compressed air delivery apparatuses 1000 causes the compressed air delivery apparatuses 1000 to drift to the sides. The preferred attachment mechanism are electromagnets 1500 that is built into the ribbon shaped compressed air delivery apparatuses 1000. The electromagnets 1500 are powered when sailing and they allow the compressed air delivery apparatus 1000 to stay in the desired position to maximize the effects of bubbles 1600.

Preferably, there is a valve controller that allows for the automatic, efficient, and proper distribution of the bubbles 1600. The valve controller is preferably a computer that will be able to take into account various sailing factors, such as speed, drifts, load, and the particular characteristics of vessel 10.

Preferably, the ends of pipes 1100 are plugged, such that the compressed air exits only through the holes 1110. If the user does not wish to use all of the holes 1110, depending perhaps on the configuration of vessel 10, the user can simply plug the holes, such as with a resin paint. Preferably, the ribbon shaped compressed air delivery apparatus 1000 may be manufactured to be any length, and depending on the size of the vessel with which it is to be used, the compressed air delivery apparatus 1000 may be cut to the appropriate length and width. The compressed air delivery apparatus 1000 is preferably inexpensive, easily replaceable, and detachable for servicing purposes.

Preferably, the invention is self contained, and no drilling or cutting of existing vessel structures is necessary. The invention may be attached to a vessel during a routine dry dock maintenance, which makes the invention not only economically feasible but advantageous. It should also be understood that the invention may be incorporated into a new vessels hull during construction of the vessel. The compressed air in the storage vessels may be distributed to barges that follow the main vessel or latter parts of a very long vessel.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. An apparatus for generating compressed air on a nautical vessel, comprising:
    at least one water intake opening;
    first and second air injectors;
    at least one descending pipe;
    at least one chamber;
    at least one pressure device; and
    at least one compressed air storage tank;
    wherein said at least compressed air storage tank has at least one air inlet valve;
    wherein said first air injector is comprised of first air intake and said second air injector is comprised of second air intake, said second injector disposed substantially below said first air injector;
    wherein a first stream of water, generated by a motion of a nautical vessel, enters said first air injectors and creates a depression that pulls an air into said first stream of water;
    wherein a plurality of air bubbles are formed in said first stream of water;
    wherein said plurality of air bubbles is carried in said first stream of water down said at least one descending pipe to said at least one chamber;
    wherein said first stream of water and said plurality of air bubbles separate in said at least one chamber forming at least one separated air portion and at least one water portion;
    wherein said at least one separated air portion is compressed by a pressure of said at least one water portion; and
    wherein said at least one compressed separated air portion passes through said at least one air inlet valve and into said at least one compressed air storage tank to form said at least one compressed air, wherein said compressed air storage tank is connected to said second injector such that said at least one compressed air is pulled into a second stream of water.

2. The apparatus for generating compressed air on a nautical vessel of claim 1,
    wherein said at least one water portion exits said at least one chamber through said at least one pressure device;
    wherein said pressure of said at least one water portion is maintained and determined by said pressure device.

3. The apparatus for generating compressed air on a nautical vessel of claim 2,
    wherein said at least one pressure device is at least one pressure valve;
    wherein said water portion exits said at least one chamber through said at least one pressure valve;
    wherein said pressure is determined by a pressure of said at least one pressure valve and a depth of said at least one descending pipe, and wherein said pressure is less than a dynamic pressure of said first stream of water.

4. The apparatus for generating compressed air on a nautical vessel of claim 3, further comprising:
    a plurality of pipes;
    wherein said plurality of pipes are connected to said at least one compressed air storage tanks;
    wherein said plurality of pipes have a plurality of valves, such that said plurality of valves are between said at least one compressed air storage tanks and a plurality of openings of said plurality of pipes;
    wherein when one or more of said plurality of valves are opened said at least one compressed air passes through said one or more open valves and exits said plurality of pipes through said plurality of openings;

wherein said at least one compressed air exits as said plurality of bubble; and wherein said plurality of exiting air bubbles reduce a friction between said nautical vessel and a water.

5. The apparatus for generating compressed air on a nautical vessel of claim 4, wherein said apparatus for generating compressed air is mounted within an interior of said hull of said nautical vessel.

6. The apparatus for generating compressed air on a nautical vessel of claim 4, wherein said apparatus for generating compressed air is mounted on an exterior of said hull of said nautical vessel.

7. An apparatus for generating compressed air on a nautical vessel, comprising:

a first water intake opening;
a first air injector;
a first descending pipe;
a first chamber;
a first water outlet valve;
a first compressed air storage tank;
a second water intake opening;
a second air injector;
a second descending pipe;
a second chamber;
a second water outlet valve; and
a second compressed air storage tank;
wherein said first compressed air storage tank has a first air inlet valve;
wherein said first air injector is comprised of a first air intake;
wherein a first stream of water, generated by a motion of a nautical vessel, enters said first air injector and creates a depression that pulls an air into said at least one stream of water;
wherein a first plurality of air bubbles are formed in said first stream of water;
wherein said first plurality of air bubbles is carried in said first stream of water down said first descending pipe to said first chamber;
wherein said at least one stream of water and said plurality of air bubbles separate in said first chamber forming at least one separated air portion and first water portion;
wherein said first separated air portion is compressed by a first pressure of said first water portion; and
wherein said first compressed separated air portion passes through said first air inlet valve and into said first compressed air storage tank to form a first compressed air;
wherein said compressed air storage tank has a second air inlet valve;
wherein said second air injector is comprised of a second air intake;
wherein said first compressed air storage tank is connected to said second air intake such that said first compressed air is pulled into second stream of water generated by said motion of said nautical vessel;
wherein a second plurality of air bubbles are formed in said second stream of water;
wherein said second plurality of air bubbles is carried in said second stream of water down said second descending pipe to said second chamber;

wherein said second stream of water and said second plurality of air bubbles separate in said second chamber forming a second separated air portion and a second water portion;

wherein said second separated air portion is compressed by a second pressure of said second water portion; and wherein second compressed separated air portion passes through said second air inlet valve and into said second compressed air storage tank to form a second compressed air.

8. The apparatus for generating compressed air on a nautical vessel of claim 7, wherein said first water portion exits said first chamber through said first water outlet valve;

wherein said first pressure is determined by said water outlet valve and a depth of said first descending pipe;

wherein said first pressure is less than a first dynamic pressure of said first stream of water;

wherein said second water portion exits said second chamber through said first water outlet valve;

wherein said second pressure is determined by said first pressure, a depth of said second descending pipe, and said second water outlet valve; and wherein said second pressure is less than a second dynamic pressure of said second stream of water.

9. The apparatus for generating compressed air on a nautical vessel of claim 8, further comprising:

a plurality of pipes;

wherein said plurality of pipes are connected to said second compressed air storage tank;

wherein said plurality of pipes have a plurality of valves, such that said plurality of valves are between said second compressed air storage tank and a plurality of openings of said plurality of pipes;

wherein when one or more said plurality of valves are opened, said second compressed air passes through said one or more open valves and exits said plurality of pipes through said plurality of openings;

wherein said second compressed air exits as said plurality of bubbles; and wherein said plurality of exiting air bubbles reduce a friction between said vessel and a water.

10. The apparatus for generating compressed air on a nautical vessel of claim 9, wherein said apparatus for generating compressed air is mounted within an interior of a hull of said nautical vessel.

11. The apparatus for generating compressed air on a nautical vessel of claim 9, wherein said apparatus for generating compressed air is mounted within an exterior of a hull of said nautical vessel.

12. The apparatus for generating compressed air on a nautical vessel of claim 9, further comprising:

one or more additional water intake openings, one or more additional air injectors, one or more additional descending pipes, one or more additional chambers, one or more additional water outlet valves; and one or more additional compressed air storage tanks, to continue to further compress said second compressed air.

* * * * *